April 14, 1931. A. BUQUOR ET AL 1,800,674
WHEEL ATTACHMENT FOR VEHICLES
Filed April 30, 1928
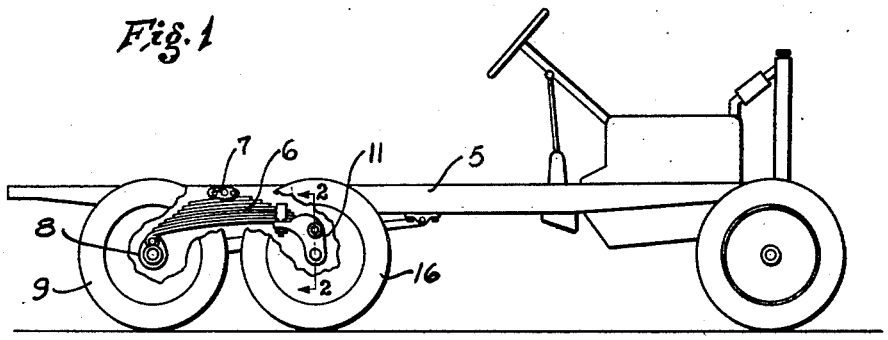
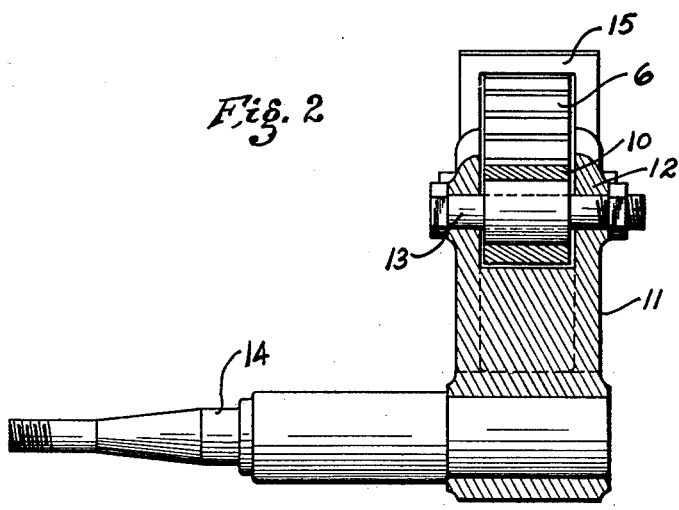
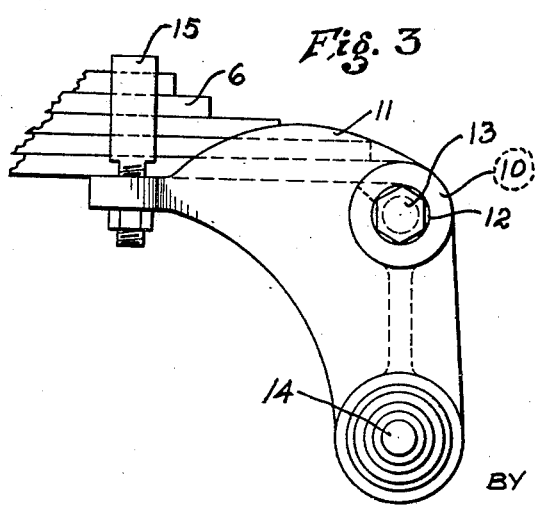
INVENTORS
Adolph Buquor
Harry Y. Stebbins
BY *Westall and Wallace*
ATTORNEYS Patented Apr. 14, 1931

1,800,674

UNITED STATES PATENT OFFICE

ADOLPH BUQUOR AND HARRY Y. STEBBINS, OF LOS ANGELES, CALIFORNIA, ASSIGNORS TO THE OHIO STATE BANK & TRUST COMPANY, OF AKRON, OHIO, A CORPORATION OF OHIO

WHEEL ATTACHMENT FOR VEHICLES

Application filed April 30, 1928. Serial No. 273,899.

This invention is especially useful for an attachment adapted to convert vehicles having four wheels into vehicles employing six wheels. However, it is not limited to the precise number of wheels before mentioned, but appertains more especially to means for adding sets of wheels to chassis.

An object of this invention is to provide an attachment which may be mounted upon the end of a spring and has an axle for mounting a wheel thereon.

A well known and conventional type of motor vehicle employs a pair of rear wheels supported by canti-lever springs. Another important object of this invention is to provide attachments for the springs which may be secured to the ends remote from the rear wheels which are commonly standard equipment. However the attachments may be secured to both ends of a spring. The invention contemplates the production of a spring supporting wheel at each end.

A further object of this invention is to provide a simple, economical attachment member adapted for ready and easy conversion of the four wheel type of vehicle before mentioned into a six wheel chassis.

These objects together with other objects and corresponding accomplishments are obtained by means of the embodiment of our invention illustrated in the accompanying drawings, in which:—

Fig. 1 is a side view of a motor vehicle having our invention incorporated therein with parts broken away to show a spring with an attachment mounted thereon; Fig. 2 is a section as seen on the line 2—2 of Fig. 1 on an enlarged scale; and Fig. 3 is a side elevation of the structure shown in Fig. 2.

Referring more particularly to the drawing, the chassis frame is marked 5, and at its rear end on opposite sides are leaf springs 6 pivotally secured immediate their ends by means of hangers 7 to the frame. Secured to the rear ends of the springs is an axle housing 8, in which the drive axle is positioned. A pair of rear ground driving wheels 9 are driven by said axle. The forward or front ends of the springs are provided with eyes 10 for securing shackles thereto to provide for attachment to the frame in the standard construction.

In our construction, each shackle has been removed and a shoe 11 mounted thereon. This shoe embraces the end of the spring and has bearings 12 for registration with the eye in the corresponding spring, a bolt 13 with a bushing pivotally connecting the spring and shoe. Projecting laterally from the body of each shoe is a stub axle 14. A clip 15 secures the end of the shoe to the spring. Mounted upon the axles are ground wheels 16.

The springs are thus converted into semi-elliptic springs pivotally supported upon the frame intermediate their ends so as to provide a lever construction. The springs may independently rock upon the frame to provide equilization on opposite sides of the vehicle.

What we claim is:—

An attachment to form a unit with a leaf spring having an eye, comprising a shoe embracing the end of the spring and having bearings for registration with the eye of the spring, a bolt for said eye, means for fixedly securing said shoe to said spring and a stub axle extending laterally from said attachment.

In witness that we claim the foregoing we have hereunto subscribed our names this 18th day of April, 1928.

ADOLPH BUQUOR.
HARRY Y. STEBBINS.